(12) United States Patent
Heo

(10) Patent No.: US 11,146,707 B2
(45) Date of Patent: Oct. 12, 2021

(54) METHOD FOR INSTALLING APPLICATION BY IMAGE FORMATION DEVICE, AND IMAGE FORMATION DEVICE USING SAME METHOD

(71) Applicant: Hewlett-Packard Development Company, L.P., Spring, TX (US)

(72) Inventor: Nam Heo, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/690,839

(22) Filed: Nov. 21, 2019

(65) Prior Publication Data

US 2020/0092427 A1 Mar. 19, 2020

Related U.S. Application Data

(63) Continuation of application No. PCT/KR2017/007394, filed on Jul. 11, 2017.

(30) Foreign Application Priority Data

Jun. 9, 2017 (KR) .................. 10-2017-0072719

(51) Int. Cl.
*H04N 1/00* (2006.01)
*G06F 8/61* (2018.01)
*G06F 9/54* (2006.01)

(52) U.S. Cl.
CPC ............ *H04N 1/0097* (2013.01); *G06F 8/61* (2013.01); *G06F 9/54* (2013.01); *H04N 1/00965* (2013.01); *H04N 2201/0046* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2004/0109188 A1* | 6/2004 | Akiyoshi | G06F 8/60 358/1.13 |
| 2008/0244057 A1* | 10/2008 | Kojima | G06F 8/61 709/223 |
| 2011/0175928 A1* | 7/2011 | Hashimoto | G06F 3/0488 345/629 |

(Continued)

FOREIGN PATENT DOCUMENTS

| | | |
|---|---|---|
| JP | 2008-242660 A | 10/2008 |
| JP | 2010-039689 A | 2/2010 |

(Continued)

*Primary Examiner* — Frantz Bataille
(74) *Attorney, Agent, or Firm* — Jefferson IP Law, LLP

(57) ABSTRACT

An example image formation device includes a memory to store a program, and a controller to, by executing the program, perform pre-processing for an application to be installed, acquire information on an amount of resources necessary for execution of the application, acquire information on an amount of available resources, determine whether installation of the application is possible based on the information on the amount of resources necessary to execute the application and the information on the amount of available resources, and install the application in the memory when it is determined that the application is installable.

18 Claims, 12 Drawing Sheets

(56) References Cited

U.S. PATENT DOCUMENTS

| | | | | |
|---|---|---|---|---|
| 2011/0307884 A1* | 12/2011 | Wabe | ................... | G06F 8/65 |
| | | | | 717/178 |
| 2014/0101664 A1* | 4/2014 | Inomata | ................... | G06F 8/61 |
| | | | | 718/104 |
| 2016/0124843 A1* | 5/2016 | Kanno | ................ | G06F 12/0246 |
| | | | | 711/103 |
| 2016/0306665 A1* | 10/2016 | Konik | ................... | G06F 9/466 |
| 2017/0068406 A1* | 3/2017 | Mark | ................... | G06F 3/0482 |

FOREIGN PATENT DOCUMENTS

| | | |
|---|---|---|
| JP | 4676977 B2 | 4/2011 |
| JP | 2014-075768 A | 4/2014 |
| KR | 10-1603910 B1 | 3/2016 |

\* cited by examiner

METHOD FOR INSTALLING APPLICATION BY IMAGE FORMATION DEVICE, AND IMAGE FORMATION DEVICE USING SAME METHOD

BACKGROUND

Recently, systems for providing application programming interfaces (APIs) based on open platforms have increased in popularity. Following this trend, there has been an increase in image formation devices with open platform APIs. Accordingly, in addition to applications provided by manufacturers of image formation devices, various applications using an open API are being provided by third-party developers. Such applications may be installed and executed on an image formation device.

Normal execution of an application provided by the manufacturer of an image formation device is expected by a user. However, because third-party applications are developed by individual developers, the third-party applications may not be normally executed on the image formation devices, and various problems may occur during the execution of the third-party applications. Further, although a problem may occur, it is difficult for the user to determine a cause of the problem and take a corrective action.

DETAILED DESCRIPTION

Various examples will be described below with reference to the attached drawings. The examples below may be embodied in many different forms. For clarity of explanation, matters that are well known to one of ordinary skill in the art to which the examples pertain will not be described in detail.

In the following description, when an element is referred to as being "connected to" another element, the element may be directly connected to the other element or an intervening element may be connected between the element and the other element. The terms "comprise," "comprises," "include," and/or "includes" as used herein specify the presence of stated features or components, but do not preclude the presence or addition of one or more other features or components, unless otherwise defined. Also, the terms "unit," "units," "module," "modules," etc. denote elements for processing at least one function or operation and may be implemented as hardware, software, or a combination of hardware and software.

In the following description, the expression "image forming job" may denote an image-related job (e.g., printing, copying, scanning, or faxing) such as forming an image, generating, storing, transmitting, etc. an image file, or the like, and the term "job" may indicate an image forming job as well as a series of processes conducted to perform the image forming job.

Also, an "image formation device" may be any device, for example, a printer, a copier, a scanner, a fax machine, a multi-function printer (MFP), a display device, or the like, which may perform an image forming job.

Also, a "hard copy" may indicate a job of printing an image on a print medium such as paper, and a "soft copy" may indicate a job of printing an image on a display device such as a television (TV), a monitor, or the like, or may indicate a job of saving an image to a memory.

Also, "content" may be any type of data that is a target of an image forming job, for example, a picture, an image, a document file, or the like.

Also, "print data" may be data converted into a format printable by a printer.

Also, a "scan file" may be a file generated by a scanner after scanning an image.

Also, a "user" may be a person who uses an image formation device, or a device connected to an image formation device in a wired or wireless manner, and conducts an image forming job or a job related to an image forming job. In addition, an "administrator" may be a person who has the authority to access all functions of an image formation device and a system. The "user" and the "administrator" may be the same person.

Figure 1:
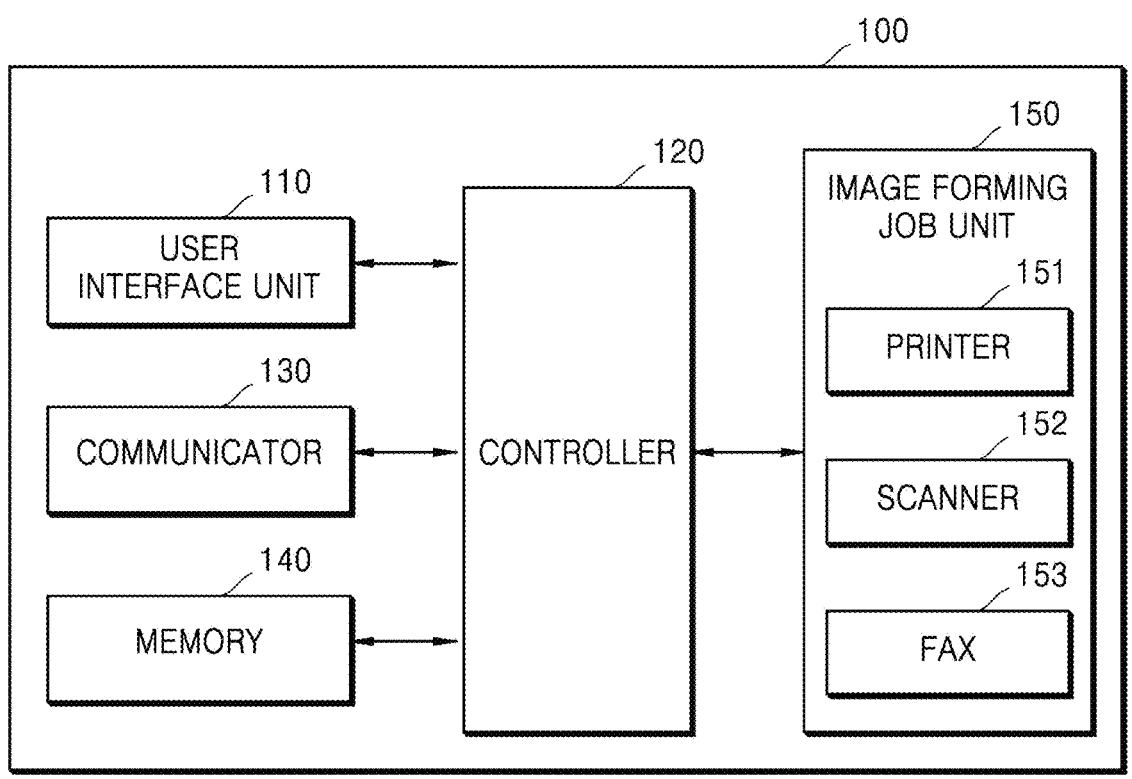
FIG. 1 is a diagram of an image formation device, according to an example.

FIG. 1 is a diagram of an image formation device, according to an example.

Referring to FIG. 1, an image formation device 100 may include a user interface unit 110, a controller 120, a communicator 130, a memory 140, and an image forming job unit 150. Also, although not shown, the image formation device 100 may further include a power supply for supplying power to each component.

The user interface unit 110 may include an input unit for receiving an input from a user, such as for performing an image forming job, and an output unit for displaying a result of performing the image forming job or information such as a state of the image formation device 100. For example, the user interface unit 110 may include an operation panel that receives a user input, a display panel that displays a screen, or the like.

As an example, the input unit may include a device, for example, a keyboard, a physical button, a touch screen, a camera, a microphone, or the like which is capable of receiving various types of user inputs. Also, the output unit may include, for example, a display panel, a speaker, or the like. However, one or more examples are not limited thereto. The user interface unit 110 may include a device that supports any of various inputs/outputs.

The controller 120 may control operations of the image formation device 100 and may include at least one processor such as a central processing unit (CPU). The controller 120 may control other components included in the image formation device 100 so as to perform an operation corresponding to a user input received from the user interface unit 110.

For example, the controller 120 may execute a program stored in the memory 140, read files stored in the memory 140, or store new files in the memory 140.

The communicator 130 may perform wired/wireless communication with another device or a network. To this end, the communicator 130 may include a communication module (e.g., a transceiver) supporting at least one of various wired/wireless communication methods. For example, the communication module may be a chipset, a sticker/barcode (e.g., a sticker including a Near Field Communication (NFC) tag) including information necessary for communication, or the like.

The wireless communication may include, for example, Wireless Fidelity (Wi-Fi), Wi-Fi Direct, Bluetooth, Ultra Wide Band (UWB), NFC, or the like. The wired communication may include, for example, universal serial bus (USB), High Definition Multimedia Interface (HDMI), or the like.

The communicator 130 may be connected to an external device and may receive/transmit signals or data from/to the external device. As an example, the image formation device 100 may be connected to an external device through the communicator 130. The communicator 130 may transmit, to the controller 120, the signals or data received from the external device or transmit, to the external device, signals or data generated by the controller 120. For example, when the communicator 130 receives a print command signal and print data from the external device, the controller 120 may output the received print data through a printer.

Figure 2:
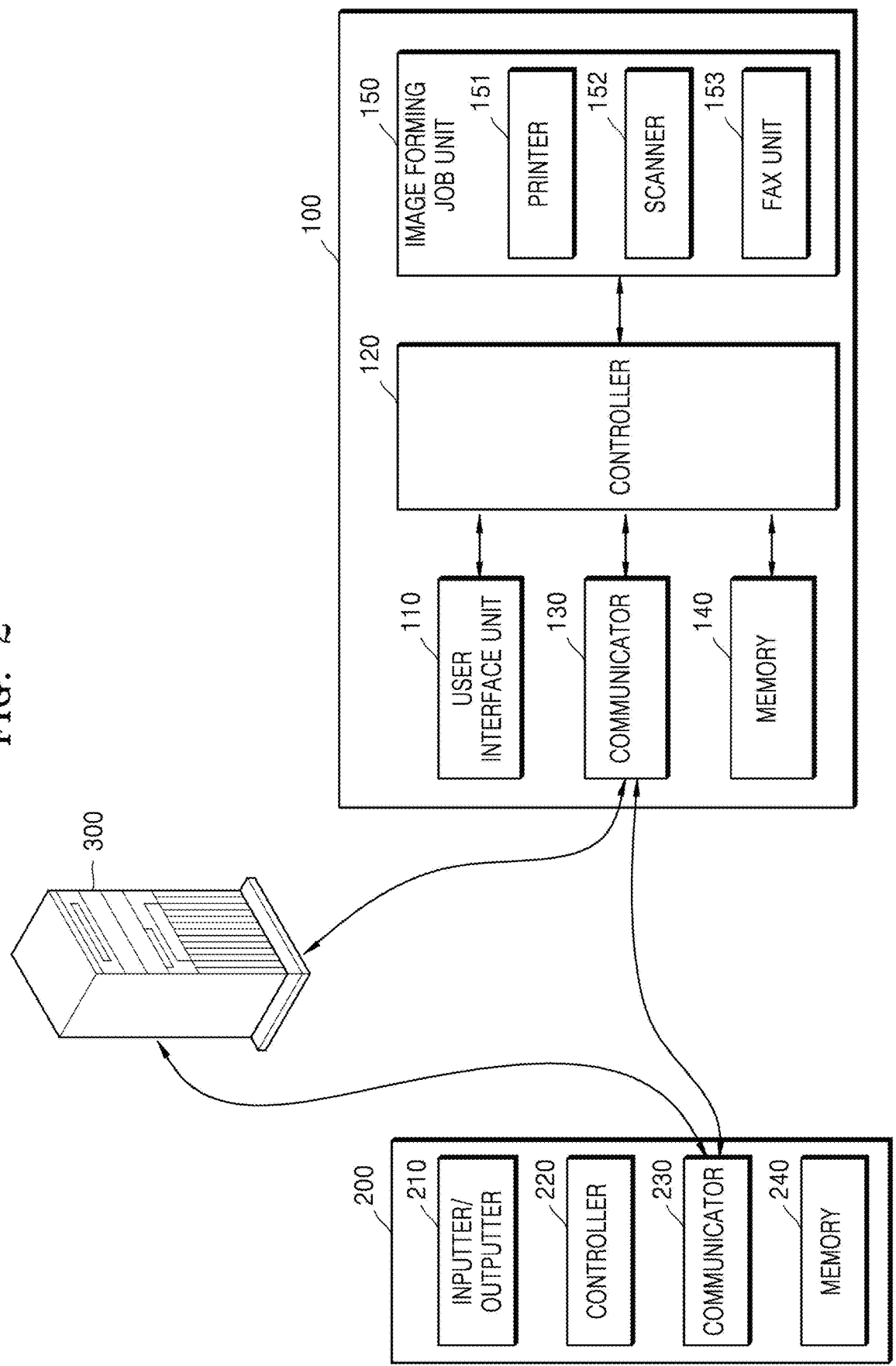
FIG. 2 is a diagram of an image formation device, a user terminal, and a server, according to an example.

FIG. 2 is a diagram of an image formation device, a user terminal, and a server, according to an example.

Referring to FIG. 2, an external device 200 may include an input unit/output unit (e.g., an inputter/outputter) 210, a controller 220, a communicator 230, and a memory 240. The controller 220 may execute programs stored in the memory 240 and transmit signals or data generated due to the execution of the programs to the image formation device 100 through the communicator 230, thereby controlling an image forming job. The external device 200 may include, for example, a smartphone, a tablet computer, a personal computer (PC), a home appliance, medical equipment, a camera, a wearable device, or the like.

The communicator 130 may be connected to a server 300 and may receive/transmit signals or data from/to the server 300. Also, the communicator 130 may be connected to the external device 200 through the server 300. That is, the communicator 130 of the image formation device 100 may receive/transmit signals or data from/to the communicator 230 of the external device 200 through the server 300.

Referring again to FIG. 1, programs such as applications may be installed and various types of data such as files may be stored in the memory 140. The controller 120 may access and use the data stored in the memory 140 or may store new data in the memory 140. Also, the controller 120 may execute the programs installed in the memory 140. In addition, the controller 120 may install, in the memory 140, applications received from an external source through the communicator 130.

The image forming job unit 150 may perform an image forming job such as printing, copying, scanning, or faxing.

Referring to FIG. 1, the image forming job unit 150 may include a printer 151, a scanner 152, and a fax unit 153. However, the image forming job unit 150 may include only some of the above components or may further include components for performing other types of image forming jobs.

The printer 151 may produce an image on a recording medium by using various print methods such as an electrophotography method, an inkjet method, a thermal transfer method, a thermosensitive method, or the like.

The scanner 152 may irradiate light onto a document and receive reflected light, thus reading an image recorded on the document. As an image sensor that reads the image from the document, a charge coupled device (CCD), a contact type image sensor (CIS), or the like may be used. The scanner 152 may be at a location where the document is fixed and may have a flatbed structure in which the image is read while the image sensor moves, a document feed structure in which the image sensor is at a fixed location and the document is fed, or a combination thereof.

The fax unit 153 may share a structure for scanning an image with the scanner 152, share a structure for printing a received file with the printer 151, and transmit a scanned file to a destination or receive a file from the outside.

The user interface unit 110 of FIG. 1 may include a separate control system. That is, separately from the controller 120 of the image formation device 100, the user interface unit 110 may include a control system (e.g., a controller, a memory, or the like) for controlling a user interface (UI) provided by the user interface unit 110. In the control system of the user interface unit 110, an operating system (OS) for providing a UI and programs such as applications for supporting various functions may be installed.

Figure 3:
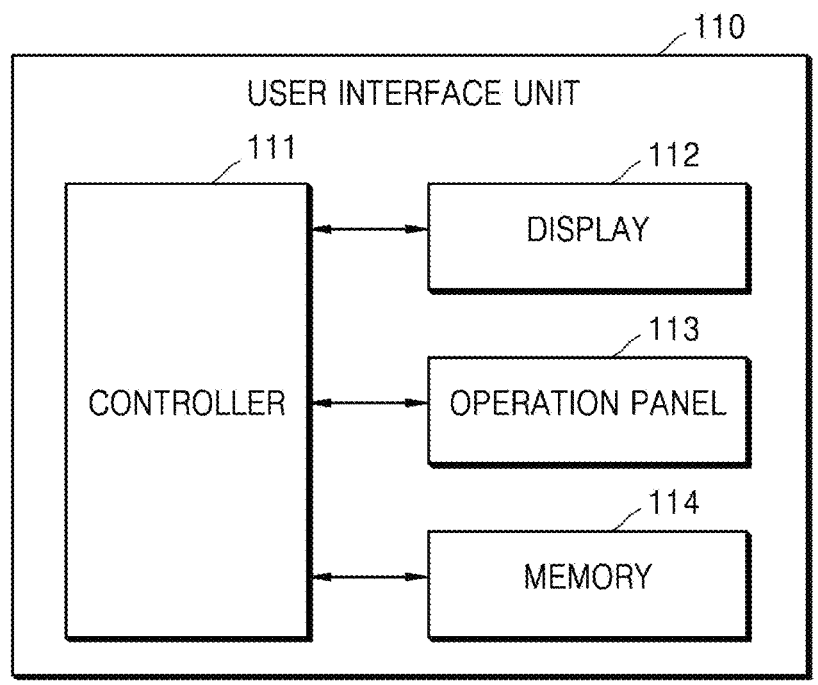
FIG. 3 is a diagram of a user interface unit, according to an example.

FIG. 3 is a diagram of a user interface unit, according to an example.

Referring to FIG. 3, the user interface unit 110 may include a controller 111, a display 112, an operation panel 113, and a memory 114.

As shown in FIG. 3, the user interface unit 110 may include a control system (e.g., the controller 111 and the memory 114) separately from the controller 120. The controller 111 and the memory 114 may control a UI provided by the user interface unit 110. Like the controller 120, the controller 111 may include a processor such as a CPU. In an example, the user interface unit 110 may not include the controller 111, and the controller 120 of the image formation device 100 may replace the controller 111.

The display 112 may include a liquid crystal display (LCD) panel, a light emitting diode (LED) panel, an organic LED (OLED) panel, or the like. The operation panel 113 may include a physical button, a touch screen, or the like.

The user interface unit 110 may be integrated with or separable from the image formation device 100 and may perform an input/output function. For example, when separated from the image formation device 100, the user interface unit 110 may operate similar to a tablet computer. In the case of the user interface unit 110 that is separable, the user interface unit 110 may further include a communicator to communicate with the image formation device 100, an external device, or the like.

The image formation device 100 may be equipped with an open platform API. Thus, in addition to applications provided by a manufacturer of the image formation device 100, various third-party applications using open APIs may be developed by third-party developers and may be installed in the image formation device 100. Because the third-party applications are developed by individual developers, it is difficult to guarantee a normal operation of the image formation device and various problems may occur according to execution of the third-party application. An example application installation method of the image formation device 100 for a normal execution of an application and an example of the image formation device 100 using the application installation method will be described.

Figure 4:
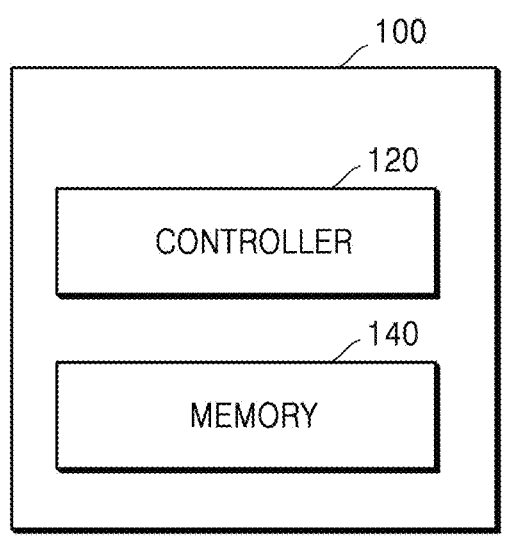
FIG. 4 is a diagram of an image formation device, according to an example.

FIG. 4 is a diagram of an image formation device, according to an example.

Referring to FIG. 4, the image formation device 100 includes the controller 120 and the memory 140.

The controller 120 may control an operation of the image formation device 100. As an example, the controller 120 may execute a program for implementing an application installation method of the image formation device 100.

The controller 120 may perform pre-processing on an application, which is to be installed, by executing the program stored in the memory and may obtain information on an amount of available resources and information on an amount of necessary resources to execute the application. Also, the controller 120 may determine whether to install the application based on the information on the necessary resources and the information on the available resources and, when it is determined that the installation of the application is available, the application may be installed in the memory.

In an example, when the amount of available resources is greater than the amount of resources necessary to execute the application, the controller 120 may determine that the application is installable. According to an example, a breakdown or a malfunction of a system, which is caused by a lack of available resources, may be prevented while the application is executed, and the image formation device 100 may continue operating normally.

In an example, the resources may include storage. In this case, the information on the amount of resources necessary to execute the application may include capacity information of the storage that is required to install and execute the application. Also, the information on the amount of available resources may include remaining capacity information of the storage of the image formation device 100. In an example, the resources may include a system memory such as a random access memory (RAM). In this case, the information on the amount of resources necessary to execute the application may include capacity information of the system memory assigned while the application is executed. Also, the information on the amount of available resources may include available capacity information of the system memory of the image formation device 100. Furthermore, when the image formation device 100 uses a virtual memory, the resources may include virtual memory.

In an example, the image formation device 100 may receive, through a wired/wireless communicator (e.g., transceiver, not shown), an application file to be installed. For example, the image formation device 100 may receive an application file to be installed by using a USB. When the user stores an application installation file in the USB and connects the USB to the image formation device 100, the image formation device 100 may copy the application installation file stored in the USB. Also, the image formation device 100 may access the server through the wired/wireless communicator and may download the application file to be installed. The image formation device 100 may download an application provided by a manufacturer of the image formation device 100 or a third-party application by using a website or an application provided by the manufacturer of the image formation device 100 or a manufacturer of the OS.

Furthermore, the image formation device 100 may download a third-party application separately provided by a third-party developer.

The controller 120 may install the application in a memory in advance so that the user may not execute the application. Also, the controller 120 may execute the application installed in advance and may obtain the information on the amount of resources necessary to execute the application based on a change in a resource usage according to the execution of the application.

In an example, the pre-installation of an application may indicate that the application is installed, but the user is not able to execute the installed application. For example, the pre-installation may indicate that the application is installed in the image formation device 100, but an icon or a selection menu for selecting the application may not be displayed on the display 112, etc. so that the user is not able to execute the application. Because it is difficult to determine whether the installed application is an application that may cause an abnormal operation of the image formation device 100, the execution of the application by the user is restricted while the pre-processing of the application is performed. In this case, however, an image, a shape, or the like, for example a display of text such as "processing" or a display of a processing state, may be displayed on the display 112 to notify the user that the installation is underway. Also, some of application-related matters or a state in which the installation of the application is being performed may be shown to the user. For example, an application icon may be indicated as a dashed line, translucently, or the like to indicate that installation of the application is being performed. Even in this case, the user may identify that the application is installed, but is unable to execute the application.

Before the application is installed in advance, the controller 120 may organize the resources. As an example, the resource organization may include a process of releasing or returning unnecessary areas which are not currently used or of which use is impossible among the assigned resources. In addition, the resource organization may include garbage collection. Furthermore, during the resource organization, different processes may be performed depending on targets.

According to an example, the controller 120 may organize the resources before the application is installed in advance and thus may prevent an abnormal operation of the image formation device 100 even though the application, which is installed in advance, excessively uses the resources. Furthermore, the controller 120 may organize the resources and thus may accurately obtain the information on the amount of resources necessary to execute the application. As an example, after the resource organization is performed, the change in the resource usage according to the execution of the application may be obtained without influences of the unnecessary areas by executing the application installed in advance, and thus the information on the amount of necessary resources may be accurately obtained.

When it is determined that the installation of the application is not possible, the controller 120 may remove the application installed in advance. In this case, after deleting the application installed in advance, the controller 120 may control the image formation device 100 to display a message indicating that the installation of the application is canceled. Also, when it is determined that the installation of the application is possible, the controller 120 may control the image formation device 100 to complete the installation. In this case, the controller 120 may display an indication that the application is executable by displaying an application icon on the display 112 of the user interface unit 110, by adding the application to a list of installed applications, or the like.

The controller 120 may compare the information on the amount of necessary resources with the information on the amount of available resources and, when the application is executed, the controller 120 may determine whether an out of the box (OOB) application of the image formation device 100 is normally executed. The OOB application refers to a basic application of the image formation device 100 and may include an application associated with copying, faxing, scanning, printing, authentication (AAA), accounts, or the like. For example, an OOB application may perform a fundamental function of the image formation device 100 and may have an essential function for a purpose that the user uses the image formation device 100, that is, for performing an image forming job.

According to an example, when an application being executed prevents a basic application of the image formation device 100 from being normally executed such that the user is unable to perform an image forming job, the controller 120 limits the installation of the application. Therefore, the user may expect the normal operation of the image formation device 100 to perform an image formation job as a minimum.

The controller 120 may obtain the information on the amount of resources necessary to execute the application based on a database including information provided using an API and resource information related to the applications stored in the memory 140. As an example, when information on the amount of resources necessary to execute each application and a relevant database are stored in the memory 140, the information on the amount of resources necessary to execute the application may be obtained by using the stored database. For example, the information on the amount of resources necessary to execute the application may be retrieved from the database by using a name of the application, version information of the application, or the like.

In an example, the controller 120 may obtain information on the amount of available resources periodically or according to an event. When the number of available resources is less than or equal to a preset reference, the controller 120 may control the image formation device 100 to display an alert message. According to an example, as the alert message is displayed to the user by monitoring a state of a resource shortage caused according to the use of the image formation device 100, the normal operation of the image formation device 100 may be maintained.

According to an example, the application may be an application executed by using a fixed resource area. In this case, the controller 120 may dynamically re-assign the fixed resource area, based on the information on the amount of available resources. The fixed resource area may include a resource area of which a size is fixed.

The memory 140 may store a program and data necessary for an operation of the image formation device 100. The memory 140 may include a volatile storage medium, a non-volatile storage medium, or a combination thereof. The volatile storage medium may include a semiconductor memory such as a random access memory (RAM), a dynamic RAM (DRAM), a static RAM (SRAM), or the like, and the non-volatile storage medium may include a hard disk, a flash NAND memory, a Read-Only Memory (ROM), an embedded Multi Media Card (eMMC), an Electrically Erasable Programmable Read-Only Memory (EEPROM), a Programmable Read-Only Memory (PROM), a magnetic memory, a magnetic disk, an optical disk, or the like.

The memory 140 may store a program for implementing an application installation method of the image formation device 100 for the normal execution of the application. Also, the memory 140 may store a database including resource information regarding the stored application. Moreover, in the memory 140, the application and the data used to execute the application may be stored.

Additionally, although not shown in FIG. 4, but shown in FIG. 1, the image formation device 100 may further include the communicator 130. The image formation device 100 may receive an application installation command from the external device 200 or the server 300 through the communicator 130 and may transmit data regarding an image or a shape according to the pre-installation of the application to the external device 200 or the server 300 through the communicator 130.

According to an example, as the information regarding the application, which is to be installed before the application is installed, is obtained and compared with the state of the image formation device 100, a determination as to whether to install the application may be made. Therefore, by limiting the installation of the application by considering a current state of the image formation device 100, the image formation device 100 may normally operate.

Figure 5:
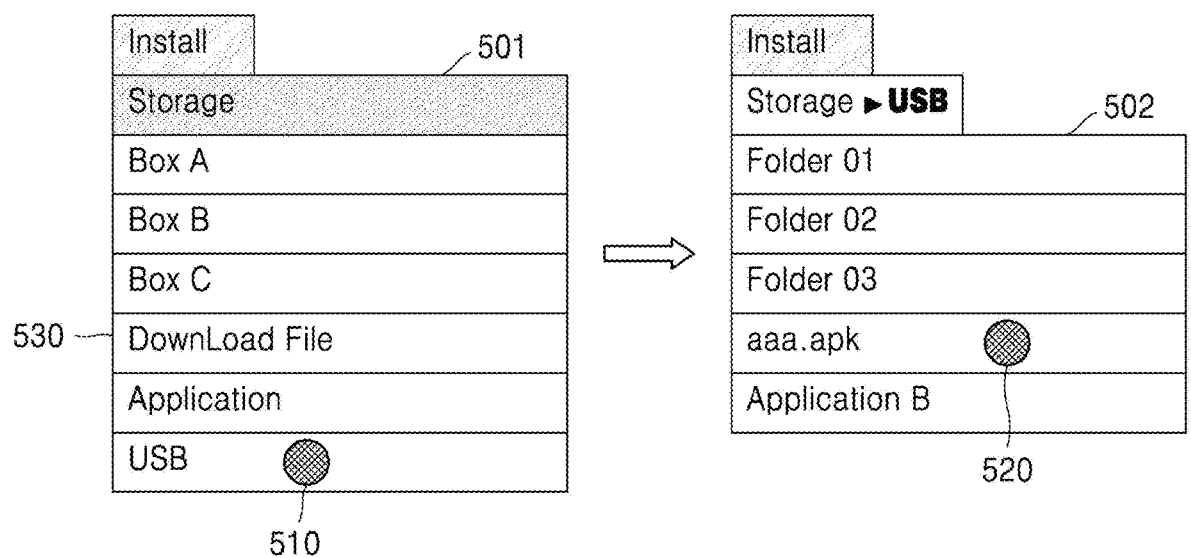
FIG. 5 illustrates a process of executing an application installation file by using a universal serial bus (USB), according to an example.

FIG. 5 illustrates a process of executing an application installation file by using a USB, according to an example.

Referring to FIG. 5, it is assumed and described that the application installation file is stored in a USB, and that the USB is connected to the image formation device 100. In an example, when the user selects an application installation job, such as by manipulating a touch screen, the image formation device 100 displays a screen 501 on which a storage (i.e., the USB) storing therein the application installation file is selected. Because the application installation file is stored in the USB, when the user makes a selection 510 of the USB from among displayed items on a menu, the image formation device 100 displays a screen 502 showing files and folders stored in the USB. When the user makes a selection 520 of an 'aaa.apk' file from among the displayed files and folders, installation of an application corresponding to the selected 'aaa.apk' file may begin.

FIG. 5 illustrates a process of installing the application installation file by using the USB. However, as described above, the installation of the application may start by selecting an application file downloaded through the wired/wireless communicator. For example, when a download file 530 is selected from among the displayed menus on the screen 501 on which the storage storing therein the application installation file is selected, a list of downloaded files may be displayed, and the application installation file may be selected from the displayed list of the downloaded files, thereby starting the installation of an application corresponding to the selected application installation file.

Figure 6:
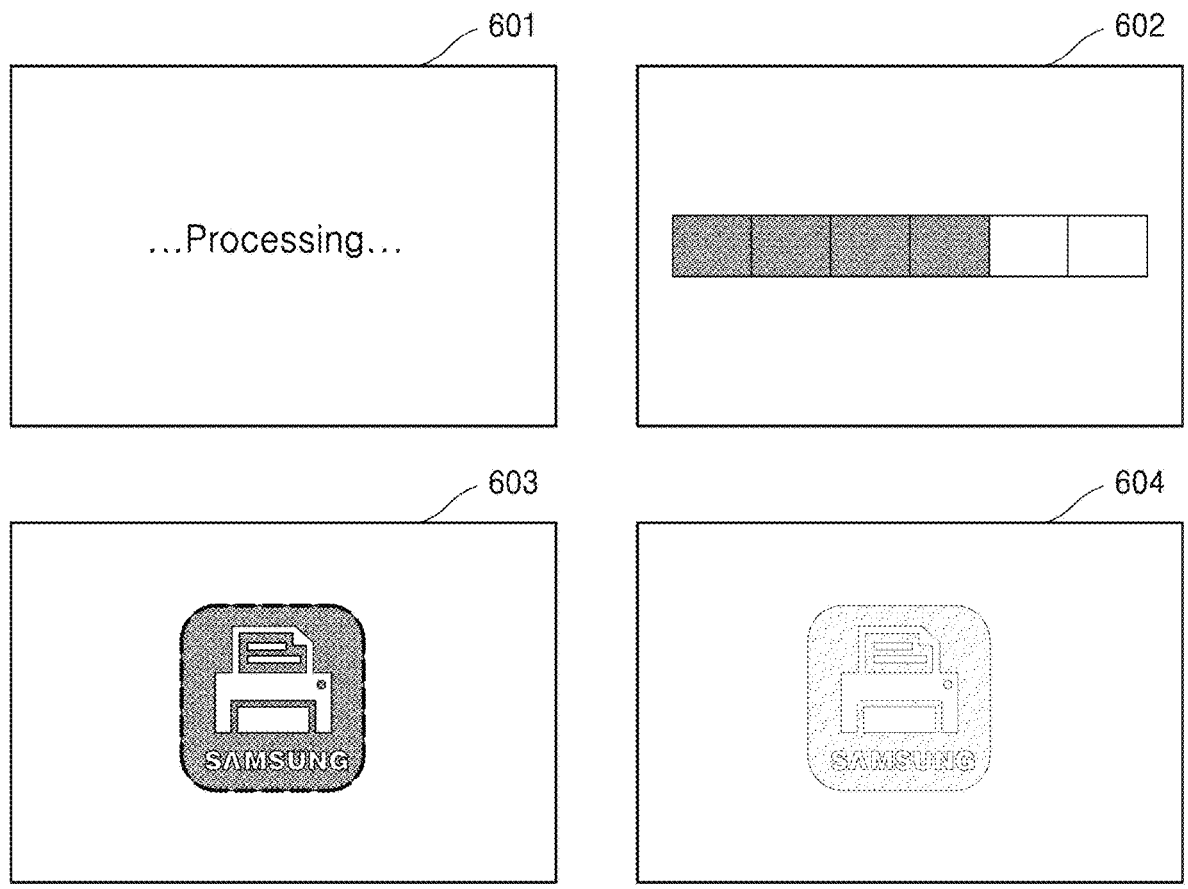
FIG. 6 illustrates screens displaying a pre-installing process of an application, according to an example.

FIG. 6 illustrates screens displaying a pre-installing process of an application, according to an example.

Figure 7:
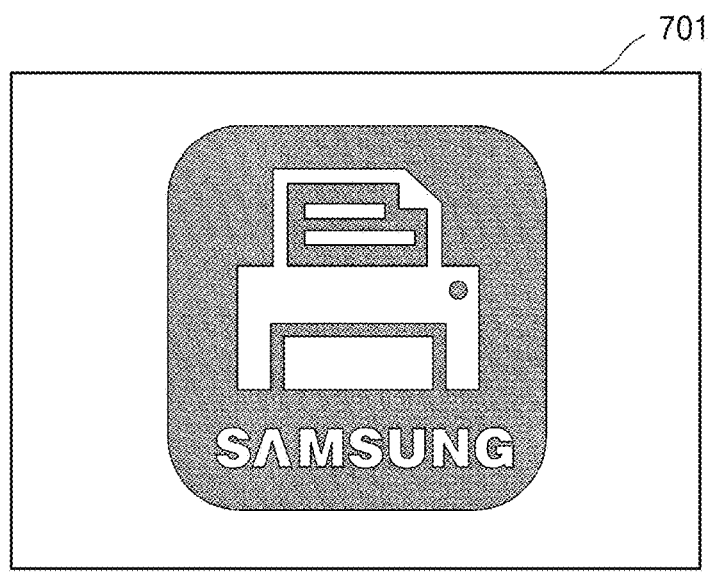
FIG. 7 illustrates a screen showing a completed installation of an application, according to an example.

FIG. 7 illustrates a screen showing completed installation of an application, according to an example.

Referring to FIG. 6, the image formation device 100 may display a screen 601 including text to indicate processing and a screen 602 including an image or a shape indicating a processing state to prevent the user from identifying the installation of the application. According to an example, although the application is installed, the user does not know that the application is installed and thus is unable to execute the application.

Also, the image formation device 100 may displays a screen 603 including an application icon as a dashed line or a screen 604 including a translucent icon to notify the user that the installation of the application is underway. Even in this case, the user may identify that the application is installed, but is unable to execute the application.

Referring to FIG. 7, unlike the incomplete icons of screens 603 and 604, a screen 701 including a complete icon may be shown. That is, when the installation of the application is completed, the image formation device 100 may display the screen 701 including a complete icon to display, to the user, a state in which the application is installed and executable.

Figure 8:
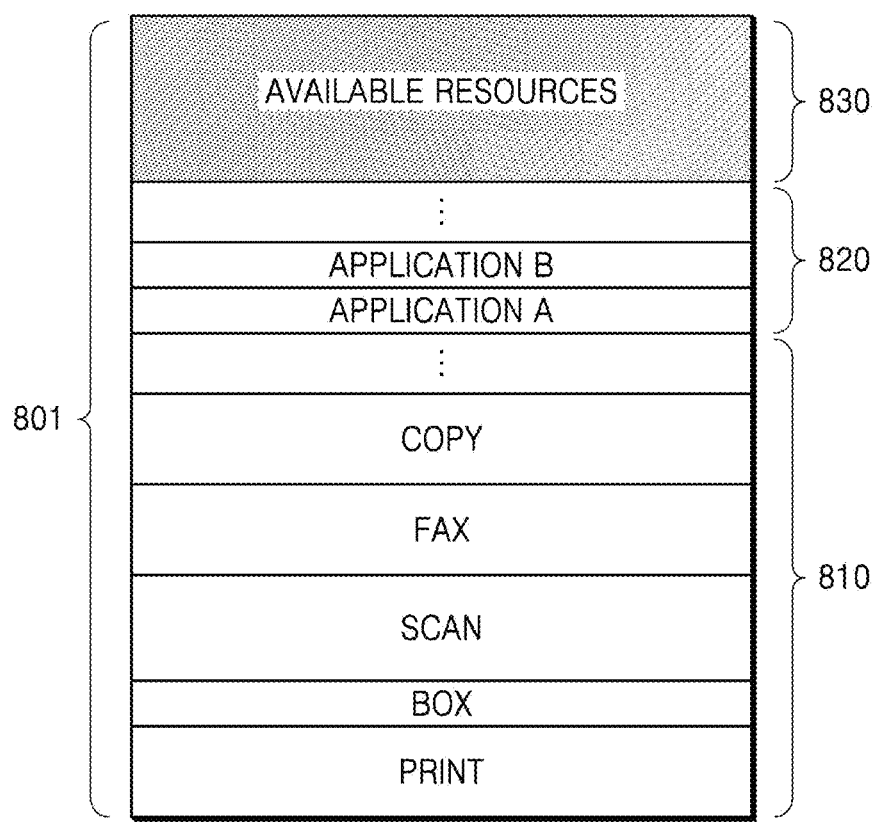
FIG. 8 illustrates a state of resources of an image formation device, according to an example.

FIG. 8 illustrates a state of resources of an image formation device, according to an example.

Referring to FIG. 8, resources 801 of the image formation device 100 may be classified into resources 810 such as copying, faxing, scanning, boxing, and printing, which are used by the OOB applications, resources 820 used by additionally installed applications such as an application A and an application B, and available resources 830. As described, assigned resource areas may differ according to the use of the image formation device 100. The resources 810 used by the OOB applications may increase or decrease according to an upgrade of the OOB applications, additional support of the manufacturer, or the like. Also, the resources 820 used by the additionally installed applications may increase or decrease according to the installation or removal of applications. In any case, when the amount of resources available to support the applications is insufficient or otherwise lacking, the image formation device 100 may not normally operate.

In an example, when the application is executed by comparing the information on the amount of necessary resources with the information on the amount of available resources, a determination as to whether the OOB applications of the image formation device 100 may be normally executed may be made. As an example, when the number of available resources 830 is greater than the number of the resources necessary to execute the application by comparing the available resources 830 with the resources necessary to execute the application, it may be determined that the installation of the application is possible. In this case, before the application is installed in advance, the resource organization may be performed to organize the resources 820 used by the additionally installed applications, except for the resources 810 used by the OOB applications. The additionally installed applications are not essential with regard to the purpose of using the image formation device 100, that is, performing an image forming job. Therefore, by organizing the resources used by the applications, the change in the resource usage according to the execution of the application may be obtained without influencing unnecessary areas, and thus the information on the amount of necessary resources may be accurately obtained.

An example application installation method of the image formation device 100 will be described. The descriptions that have already provided will be only briefly provided below for conciseness.

Figure 9:
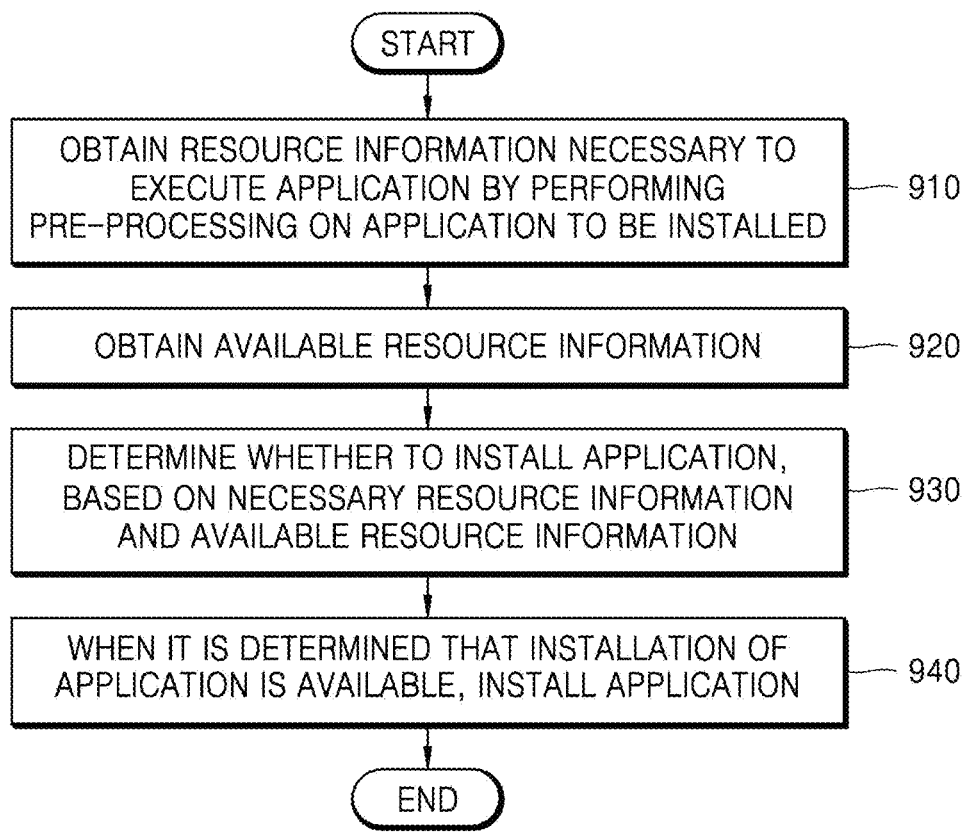
FIG. 9 illustrates an application installation method of an image formation device, according to an example.

FIG. 9 illustrates an application installation method of an image formation device, according to an example.

Referring to FIG. 9, the image formation device 100 may perform pre-processing on an application to be installed and may obtain information on an amount of resources necessary to execute the application in operation 910. As an example, the image formation device 100 may install the application in advance so as not to display application-related matters to the user, execute the application installed in advance, and obtain the information on the amount of resources necessary to execute the application based on a change in a resource usage according to the execution of the application. The image formation device 100 may organize the resources before the application is installed in advance. Also, the image formation device 100 may obtain the information on the amount of resources necessary to execute the application, based on information provided using an API or a stored database.

In operation 920, the image formation device 100 may obtain information on the amount of available resources.

In operation 930, the image formation device 100 may determine whether to install the application based on the information on the amount of necessary resources and the information on the amount of available resources. In this case, the image formation device 100 may compare the information on the amount of necessary resources with the information on the amount of available resources, and when the application is executed, the image formation device 100 may determine whether an OOB function of the image formation device 100 is normally performed.

In operation 940, when it is determined that the installation of the application is possible, the image formation device 100 may install the application. In this case, the image formation device 100 may complete the installation of the application and may display the application-related matters.

Although not shown in FIG. 9, when it is determined that the installation of the application is not possible, the image formation device 100 may remove the application installed in advance. In this case, the image formation device 100 may remove the application installed in advance and may display a message indicating that the installation of the application is canceled.

Also, the application may be executed using a fixed resource area, and the image formation device 100 may dynamically re-assign the fixed resource area based on the available resource information.

According to an example, the image formation device 100 may obtain information regarding the application, which is to be installed before the application is installed, and may determine whether to install the application by comparing the obtained information with a current state of the image formation device 100. Therefore, by restricting the installation of the application by considering the state of the image formation device 100, the normal operation of the image formation device 100 is possible.

Figure 10:
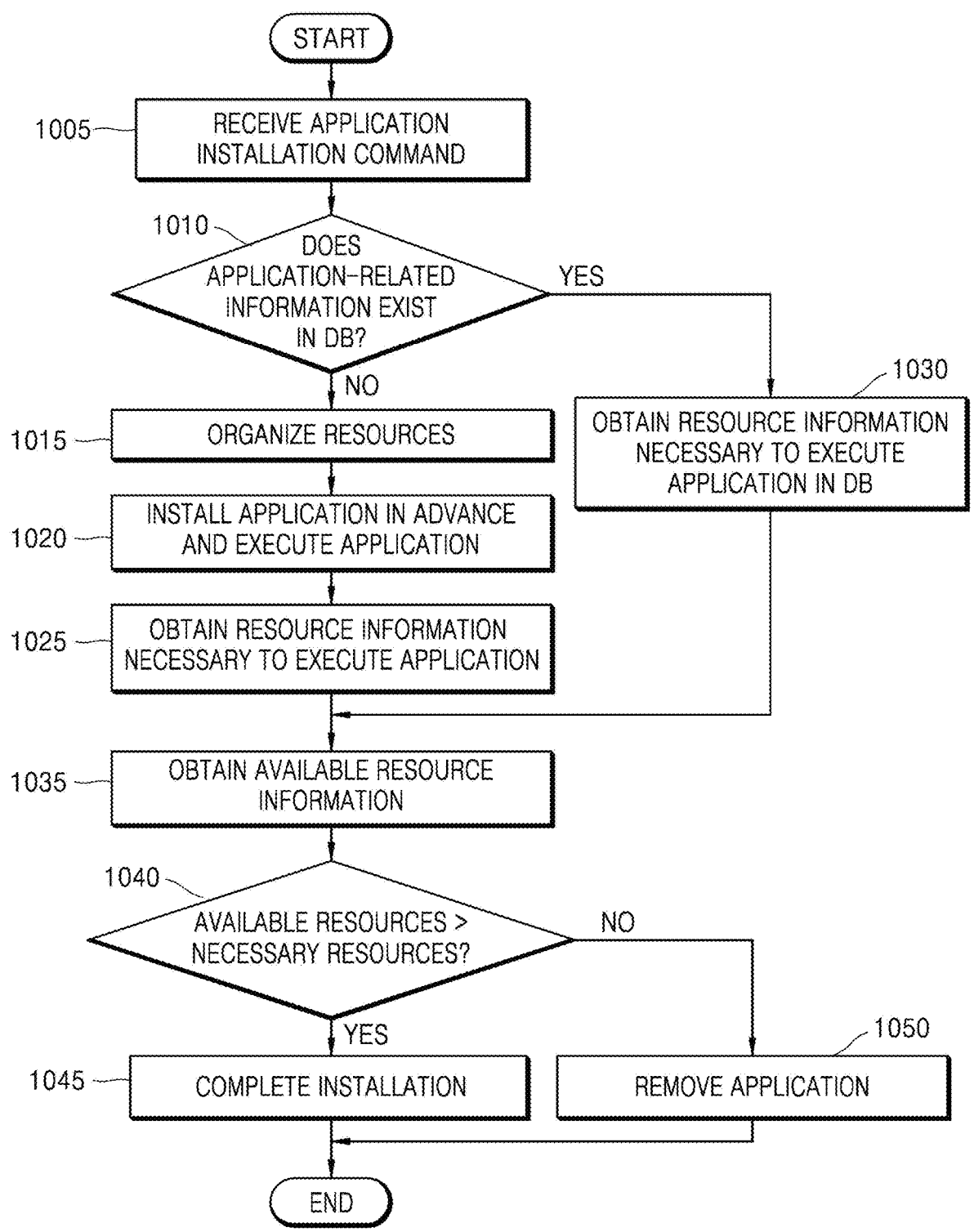
FIG. 10 illustrates an application installation method of an image formation device, according to an example.

FIG. 10 illustrates an application installation method of an image formation device, according to an example.

Referring to FIG. 10, it is assumed that the image formation device 100 is equipped with a java virtual machine (JVM).

In operation 1005, the image formation device 100 may receive an application installation command. In this case, the image formation device 100 may receive an application installation command through the user interface unit 110 or from the external device 200 or the server 300 through the communicator 130.

In operation 1010, the image formation device 100 may determine whether application-related information exists in a database. The image formation device 100 may retrieve a name, version information, etc. of the application from the database and may determine whether the application-related information exists. When it is determined in operation 1010 that the application-related information is not included in the database, the image formation device 100 may proceed to operation 1015. On the other hand, when it is determined in operation 1010 that the application-related information exists in the database, the image formation device 100 may proceed to operation 1030.

In operation 1015, the image formation device 100 may organize the resources. In an example, the image formation device 100 may perform a full garbage collection and may organize resources regarding the installation and execution of the application. Here, the resources may be fixed resources. For example, the fixed resources may be perm areas used in a java memory for java sublets, class loaders, or the like. Because it is difficult to change the perm areas during the runtime, there is a need to determine whether the image formation device 100 may normally operate before the installation of the application. Before a java processor is executed when the image formation device 100 boots, perm allowable sizes may be dynamically adjusted in the perm areas. By adjusting the perm allowable sizes, it is possible to effectively use the resources of the image formation device 100.

In operation 1020, the image formation device 100 may install the application in advance and execute the application. In operation 1025, the image formation device 100 may obtain information on the amount of resources necessary to execute the application. As an example, the image formation device 100 may start bundles installed in advance and determine an increment of the perm areas before and after starting the bundles and thus obtain the information on the amount of resources necessary to execute the application. The bundles may include units of modules and units enabling installation, update, or distribution.

In operation 1030, based on the application-related information retrieved in operation 1010, the information on the amount of resources necessary to execute the application may be obtained from the database.

In operation 1035, the image formation device 100 may obtain the information on the amount of available resources. The image formation device 100 may start bundles of the entire system and determine the increment in the perm areas before and after starting the bundles, thereby obtaining information regarding available perm areas. Also, after booting, the image formation device 100 may use an activator that is a class for managing a bundle lifecycle and when each bundle associated with the application installed in advance starts, a thread group regarding the corresponding bundle may be designated. In this case, because it is possible to determine information regarding resources that are being used for each bundle (or a jar unit using multiple APIs), perm areas using the entire bundles may be identified, and information regarding the available perm areas may be obtained accordingly.

In operation 1040, the image formation device 100 may determine whether the number of available resources is greater than the number of resources necessary to execute the application. When it is determined that the number of available resources is greater than the number of resources necessary to execute the application in operation 1040, operation 1045 is performed to complete the installation of the application. When it is determined in operation 1040 that the number of available resources is not greater than the number of resources necessary to execute the application, operation 1050 is performed to remove the application installed in advance.

Figure 11:
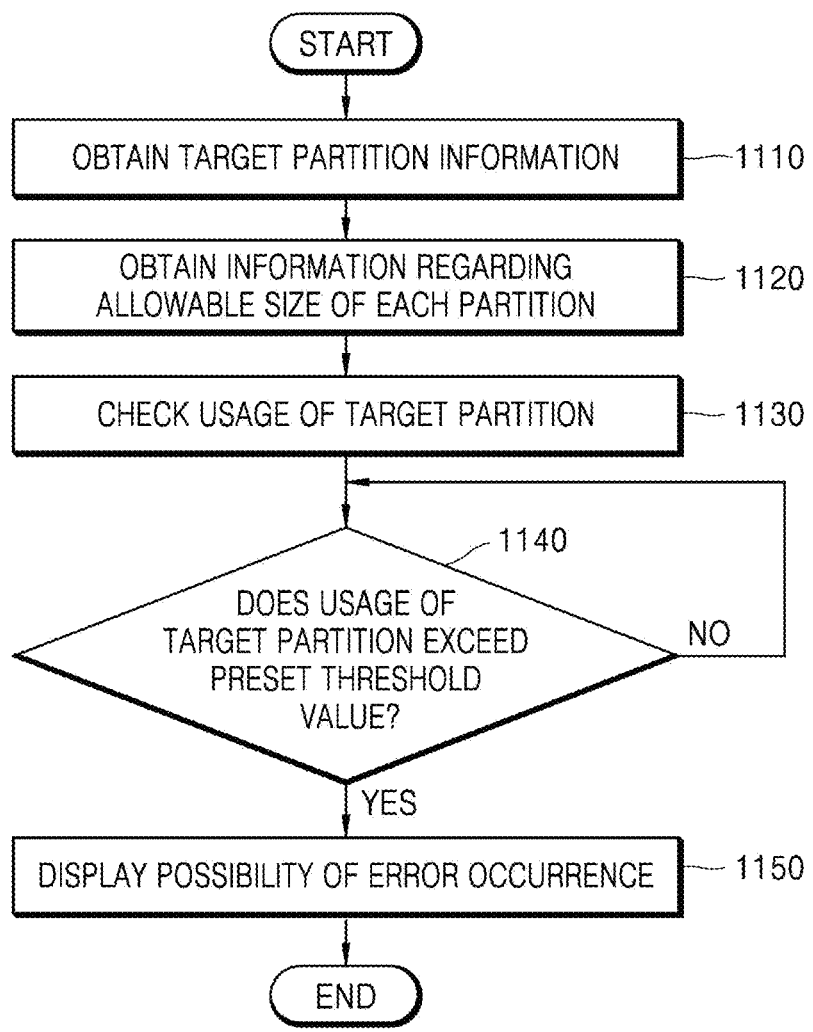
FIG. 11 illustrates a resource management method while an application of an image formation device is executed, according to an example.

FIG. 11 illustrates a resource management method while an application of an image formation device is executed, according to an example.

Referring to FIG. 11, the image formation device 100 may obtain target partition information in operation 1110. In operation 1120, information regarding an allowable size of each partition is obtained. In operation 1130, a usage of a target partition is determined.

In operation 1140, the image formation device 100 determines whether the usage of the target partition is greater than a preset threshold value. When it is determined in operation 1140 that the usage of the target partition is greater than the preset threshold value, operation 1150 is performed in which a possibility of the error occurrence is displayed. Depending on the usage of the target partition, the execution of the application may stop. When the usage of the target partition is not greater than the preset threshold value, operation 1140 is repeatedly performed to monitor whether the usage is greater than the threshold value.

The process may be performed periodically or at a point in time when a certain event occurs.

The storage of the image formation device 100 has limitations on its size and sizes of respective partitions used by applications. Therefore, when a certain application excessively uses a certain partition area, other OOB applications may malfunction, or a problem may occur with regard to the performance of the image formation device 100. According to an example, the resource management may be performed in the storage by using the above method.

Figure 12:
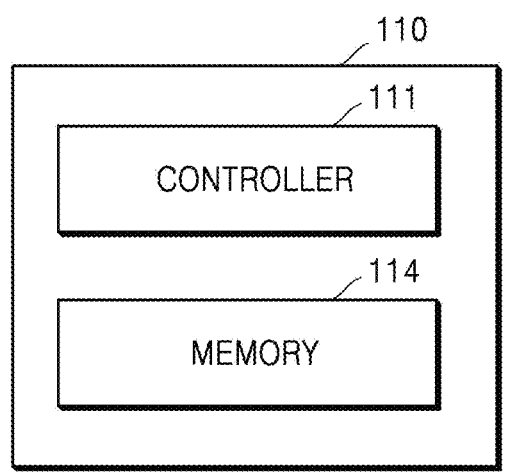
FIG. 12 illustrates a user interface unit, according to an example.

FIG. 12 illustrates a user interface unit, according to an example.

Referring to FIG. 12, the user interface unit 110 may include the controller 111 and the memory 114 as a control system separately from the controller 120. The controller 111 and the memory 114 may control a UI provided by the user interface unit 110.

When the user interface unit 110 includes a separate control system, for example, when the user interface unit 110 is a device separable from the image formation device 100, the user interface unit 110 may still be part of the image formation device 100. Therefore, the above-described application installation method of the image formation device 100 may be applied to the user interface unit 110 having the separate control system.

For example, a third-party application related to a UI may be installed in the user interface unit 110. When the third-party application excessively uses control system resources of the user interface unit 110, the user interface unit 110 may not normally operate, and additionally the image formation device 100 may not normally operate or the performance thereof may degrade.

Therefore, the user interface unit 110, which is part of the image formation device 100, may obtain information on the amount of resources necessary to execute the application by performing pre-processing on the application to be installed, may determine whether to install the application based on the information on the amount of resources necessary to execute the application and information on the amount of available resources, and, when it is determined that the installation of the application is possible, the user interface unit 110 may install the application in the memory.

The one or more described examples may be realized as a non-transitory computer-readable recording medium in which instructions executable by a computer and data are stored. At least one of the instructions and data may be stored as program code, and when executed by a processor, the at least one of the instructions and data may generate a certain program module and perform a certain operation.

Examples of the computer-readable recording medium include a magnetic storage media (e.g., hard disks, etc.), an optical recording media (e.g., CD-ROMs, or DVDs), etc., and the non-transitory computer-readable recording medium may be a memory included in a server accessible via a network. For example, the non-transitory computer-readable recording medium may be at least one of the memory 140 of the image formation device 100 or the memory 114 of the user interface unit 110, or may be the memory 240 included in the external device 200 connected to the image formation device 100 via the network.

The disclosure has been shown and described with reference to examples thereof. It will be understood by one of ordinary skilled in the art that various changes in form and details may be made therein without departing from the spirit and scope of the disclosure as defined by the appended claims. The examples should be considered in descriptive sense only and not for purposes of limitation. Therefore, the scope of the disclosure is defined not by the detailed description of the disclosure but by the appended claims, and all differences within the scope will be construed as being included in the disclosure.

What is claimed is:

1. An image formation device comprising:
a memory to store a program; and
a controller to, by executing the program:
organize resources of the memory,
pre-install an application in the memory and prevent a user from selecting the application,
execute the application,
obtain information on an amount of resources necessary to execute the application based on a change in a resource usage according to the execution of the application,
obtain information on an amount of available resources,
determine whether installation of the application is possible based on the information on the amount of resources necessary to execute the application and the information on the amount of available resources, and
complete the installation of the application in the memory and permit a user to select the application when it is determined that the installation of the application is possible,
wherein the resources of the memory are organized before the pre-installation of the application and the execution of the application, and
wherein the resource organization includes returning an unnecessary resource area which is not currently used or of which use is impossible among assigned resources.

2. The image formation device of claim 1, wherein the controller is to:
when it is determined that the completion of the installation of the application is not possible, remove the application.

3. The image formation device of claim 2, wherein the controller is to control a display to display a message indicating that the completion of the installation of the application is canceled after the application is removed.

4. The image formation device of claim 1, wherein the controller is to:
compare the information on the amount of resources necessary to execute the application with the information on the amount of available resources, and
when the application is executed, determine whether an out of the box (OOB) application of the image formation device is normally executed.

5. The image formation device of claim 1, wherein the application comprises an application that is executed using a fixed resource area.

6. The image formation device of claim 5, wherein the controller is to dynamically re-assign the fixed resource area based on the information on the amount of available resources.

7. The image formation device of claim 1,
wherein the memory is to store a database comprising resource information regarding the application, and
wherein the controller is to obtain the information on the amount of resources necessary to execute the application, based on information provided using an application programming interface (API) or based on the database.

8. The image formation device of claim 1, wherein the controller is to:
obtain the information on the amount of available resources periodically or according to an event, and
when a number of available resources is less than or equal to a preset threshold, control a display to display an alert message.

9. An application installation method of an image formation device, the application installation method comprising:
organizing resources of a memory of the image forming device,
pre-installing an application in the memory and preventing a user from selecting the application;
executing the application,
obtaining information on an amount of resources necessary to execute the application based on a change in a resource usage according to the execution of the application;
obtaining information on an amount of available resources;
determining whether installation of the application is possible based on the information on the amount of resources necessary to execute the application and the information on the amount of available resources; and
when it is determined that the installation of the application is possible, completing installation of the application and permitting the user to select the application,
wherein the resources of the memory are organized before the pre-installing of the application and the executing of the application, and
wherein the resource organization includes returning an unnecessary resource area which is not currently used or of which use is impossible among assigned resources.

10. The application installation method of claim 9, further comprising:
when it is determined that the completing of the installation of the application is not possible, removing the application.

11. The application installation method of claim 9, wherein the determining of whether installation of the application is possible comprises:
comparing the information on the amount of resources necessary to execute the application with the information on the amount of available resources; and
when the application is executed, determining whether an out of the box (OOB) application of the image formation device is normally executed.

12. The application installation method of claim 9,
wherein the application comprises an application that is executed using a fixed resource area, and wherein the application installation method further comprises dynamically re-assigning the fixed resource area based on the information on the amount of available resources.

13. The image forming device of claim 1, wherein the controller is to prevent the user from selecting the application by preventing a display to display of an icon or a menu item for selecting the application.

14. The image forming device of claim 1, wherein the controller is to control a display to display an indication that the determining of whether installation of the application is possible is underway.

15. The image forming device of claim 14, wherein the indication includes an image, a shape, an icon having a dashed line, or an icon displayed translucently.

16. The image forming device of claim 1, wherein the controller is to permit the user to select the application by controlling a display to display an icon or a menu item for selecting the application.

17. The image forming device of claim 1, wherein the resource organization further includes garbage collection.

18. The application installation method of claim 9, wherein the organizing of the resources further includes collecting garbage.

* * * * *